United States Patent
Choudhary et al.

(10) Patent No.: US 6,509,000 B1
(45) Date of Patent: Jan. 21, 2003

(54) LOW TEMPERATURE PROCESS FOR THE PRODUCTION OF HYDROGEN

(75) Inventors: Vasant Ramchandra Choudhary, Pune (IN); Amarjeet Munshiram Rajput, Pune (IN); Subhabrata Banerjee, Pune (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 09/652,377

(22) Filed: Aug. 31, 2000

(51) Int. Cl.$^7$ .................................... C01B 3/26
(52) U.S. Cl. ................ 423/652; 423/653; 423/654
(58) Field of Search ................... 423/652, 653, 423/654; 252/373

(56) References Cited

U.S. PATENT DOCUMENTS

| | | | | |
|---|---|---|---|---|
| 4,079,017 A | * | 3/1978 | Crawford et al. ............ | 252/373 |
| 5,004,592 A | * | 4/1991 | Pinto ........................... | 423/652 |
| 6,293,979 B1 | * | 9/2001 | Choudhary et al. ......... | 423/654 |

OTHER PUBLICATIONS

Choudhary, T.V. and Goodman, D.W., "Stepwise Methane Steam Reforming : A Route to Co–Free Hydrogen," *Catalysis Letter*, vol. 59, pp. 93, 94 (1999) (No Month).*

* cited by examiner

*Primary Examiner*—Wayne A. Langel
(74) *Attorney, Agent, or Firm*—Ladas & Parry

(57) ABSTRACT

A process for the continuous production of hydrogen from methane and/or natural gas and/or methane-rich hydrocarbons and steam at low temperature, using a solid catalyst comprising group VIII metal oxide(s) in two parallel reactors, comprising reducing the solid catalyst in both the reactors by contacting the catalyst with a gaseous feed comprising a reducing agent, contacting a first gaseous feed comprising methane and/or natural gas and/or methane rich hydrocarbons, simultaneously contacting a second gaseous feed comprising steam called Feed-B with the solid catalyst reduced in step-i in a second reactor. while regularly switching over the two feeds, Feed-A arid Feed-B, between the two parallel reactors to obtain a mixed product stream comprising hydrogen from the two reactors.

20 Claims, No Drawings

LOW TEMPERATURE PROCESS FOR THE PRODUCTION OF HYDROGEN

FIELD OF THE INVENTION

The present invention relates to a low temperature process for the production of hydrogen from methane or methane rich hydrocarbons and steam. More particularly the present invention relates to a low temperature process for the production of hydrogen from methane or methane rich hydrocarbons and steam using a group VIII metal oxide(s) containing solid catalysts in two parallel reactors. The present invention also particularly relates to a process for the continuous production of hydrogen from methane or methane rich hydrocarbons and steam at low temperature below 650° C. using a group VIII metal oxide(s) containing solid catalyst in two parallel reactors operated in a cyclic mariner for the decomposition of methane or methane rich hydrocarbons to hydrogen and carbon, which is deposited on the catalyst, and for the gasification of the carbon deposited on the catalyst by steam in the presence or absence of oxygen.

BACKGROUND OF THE INVENTION

The demand for hydrogen is increasing day by day for hydrotreating processes in petroleum industries and also for hydrogen fuel cells, both stationary and non-stationary fuel cells. Since hydrogen is a non-polluting fuel, its use as a fuel particularly for fuel cells used in the automobile transport has been increasing very fast. However, hydrogen fuel cells require carbon monoxide free hydrogen as a fuel to avoid deactivation of the noble metal catalyst in the fuel cells.

The main natural sources of hydrogen are hydrocarbons and water. Amongst hydrocarbons, methane has the highest hydrogen to carbon ratio and is hence the most preferred choice amongst hydrocarbons for hydrogen conversion.

Conventional processes for the production of hydrogen are based on steam reforming of hydrocarbons, such as naphtha and methane or natural gas and autothermal reforming of hydrocarbons, particularly heavier hydrocarbons. Hydrogen production processes have been recently reviewed by Fierro and co-workers [Pena, M. A., Gomez, J. P., and Fierro, J. L. G., Applied Catalysis A. General, volume 144, page 7–57, 1996].

The prior art processes of hydrocarbon steam reforming and autothermal reforming are operated at high temperatures of over about 900° C. and the product stream of these processes contains appreciable amounts of carbon monoxide along with hydrogen. The prior art processes also suffer from the disadvantage that removal of carbon monoxide at low concentrations from hydrogen is very expensive. The high cost factor involved in the separation of carbon monoxide from hydrogen and limitations of high temperature required for operation renders both prior art processes uneconomical for the production of carbon monoxide free hydrogen.

The prior art also discloses processes for the production of carbon monoxide free hydrogen from methane at low temperatures of below 600° C. Recently, Kikuchi has described a process based on steam reforming of methane in a membrane reactor to produce hydrogen free of carbon monoxide (Kikuchi, E., *Hydrogen permselective membrane reactors*, CATTECH, March 1997, pages 67–74, Balzer Science Publishers). Kikuchi discloses the use of a Pd/ceramic composite membrane for steam reforming of methane over a commercial supported nickel catalyst at temperatures as low as 500° C., to obtain methane conversion to carbon monoxide free hydrogen of upto 100%. The hydrogen produced in this process by the steam reforming of methane is continuously removed form the reaction system by the selective permeation of hydrogen through the Pd-membrane. However, this process suffers from the following limitations or drawbacks: 1) Because of the use of a number of Pd-membrane tubes, the capital costs are very high; 2) potential for the deactivation of the Pd-membrane due to the deposition of carbonaceous matter exists, 3) membrane stability is a problem; 4) there is a possibility of membrane failure due to the formation of pin holes in the membrane.

Japanese patent JP 09234372 A2 of Sep. 2, 1997 discloses a process for the manufacture of hydrogen by thermal decomposition of hydrocarbons at 200° C.–1000° C. using a catalyst containing nickel, alkali or alkaline earth compounds.

Russian patent RU 2071932 C1 of Jan. 20, 1997 discloses the production of hydrogen and carbon by the thermal decomposition of methane on nickel catalyst. Japanese patent JP 11228102 A2 discloses reactors for the thermal decomposition of methane to form carbon and hydrogen.

Hydrogen production by catalytic cracking of methane or natural gas and other hydrocarbons below 900° C. is disclosed in a few publications [Zhang, T and Amiridis, M. D., Applied Catalysis A: General, Volume 167; pages 161–172, 1998; Muradov, N. Z. Energy Fuels, Volume 12, pages 41–48, 1998; Kuvshinov, G. G., et al, Hydrogen Energy Progress XI Proceedings of the World Hydrogen Energy Conference,. 11$^{th}$, Volume 1, pages 655–660, edited by Veziroglu, T., 1996; Muradov, N. Z., Proceedings of US DOE Hydrogen Program Review, volume 1, page 513–535, 1996].

While the hydrogen produced in the above prior art processes, based on catalytic cracking or thermo-catalytic decomposition of methane and other hydrocarbons, is free from carbon monoxide and carbon dioxide, the rate of deactivation of the catalyst is high due to the carbon formed and deposited on the catalyst accompanied by an increase in the pressure drop across the catalyst bed. This makes the above processes unsuitable for hydrogen production on a commercial scale.

Choudhary and Goodman recently report a process for the production of carbon monoxide free hydrogen involving step wise methane stream reforming [Choudhary, T. V. and Goodman, D. W., Catalysis Letter, volume 59, page 93–94, 1999]. In this process, methane pulse and water pulses are alternately passed over a pre-reduced nickel based catalyst at 375° C. When methane pulse is passed over the catalyst, the methane from the pulse decomposes to hydrogen en and carbon, leaving the carbon deposited on the catalyst. When the water pulse is passed over the catalyst with carbon deposited thereon, the carbon on the catalyst reacts with steam to form $CO_2$, hydrogen and methane. In this process, although the carbon monoxide free hydrogen is produced by, the catalytic cracking of methane and the carbon deposited on the catalyst is removed by the cyclic operation of the methane and water pulses in the same reactor, the process is not operated in steady state and hydrogen production is not continuous. It is therefore not practical or economical to produce carbon monoxide free hydrogen on large scale by this transient process involving cyclic operation of the methane and water pulses.

In view of the above mentioned drawbacks and limitations of prior art processes, there is a pressing need to develop a continuous process for the production of carbon monoxide-free hydrogen by catalytic decomposition of methane or natural gas at low temperature of below 600° C., thereby avoiding the carbon build up on the catalyst by its periodic removal.

OBJECTS OF THE INVENTION

It is an object of the invention to provide a low temperature process for the continuous production of hydrogen from methane or methane rich hydrocarbons and steam.

It is yet another object of the invention to provide a process for the continuous production of hydrogen from methane or methane rich hydrocarbons and steam that is cost effective.

It is a further object of the invention to provide a process for the continuous production of hydrogen that is carbon monoxide or carbon dioxide free and is useful as a fuel.

It is another object of the invention to provide a process for the production of hydrogen that is carbon monoxide or carbon dioxide free in while avoiding build up of carbon on the catalysts.

It is another object to provide a low temperature process for the continuous production of hydrogen from methane or methane rich hydrocarbons and steam that avoids the problem of high cost involved in the removal of carbon monoxide from hydrogen at low concentrations and is therefore cost effective.

SUMMARY OF THE INVENTION

Accordingly, the present invention provides a process for the continuous production of hydrogen from a feed comprising of methane and/or natural gas and/or methane rich hydrocarbons, and steam at low temperature using a solid catalyst comprising of group VIII metal oxide(s) in two parallel reactors, said process comprising:

i. reducing the solid catalyst in both the reactors by contacting the catalyst with a gaseous feed comprising a reducing agent at a concentration in the range of from 1 mole % to 100 mole %, at a gas hourly space velocity in the range of from 100 $cm^3g^{-1}h^{-1}$ to about 100000 $cm^3g^{-1}h^{-1}$ at a temperature in the range of from 350° C. to 650° C. and at a pressure of at least 1.0 atm. for a time period in the range of 0.1 hour to 100 hours;

ii. contacting a first gaseous feed comprising methane and/or natural gas and/or methane rich hydrocarbons called Feed A at a gas hourly space velocity in the range of from 50 $cm^3g^{-1}h^{-1}$ to 50000 $cm^3g^{-1}h^{-1}$ with the solid catalyst reduced in step i. above in a first reactor called Reactor A, at a temperature in the range of from 300° C. to 650° C. and at a pressure of about at least 1.0 atm., simultaneously contacting a second gaseous feed comprising steam called Feed B with the solid catalyst reduced in step i. above in a second reactor called Reactor B, at the same gas hourly space velocity, temperature and pressure as that employed in the said first reactor, while regularly switching over the said first feed and the said second feed between the two parallel reactors at a time interval of from 0.1 minute to 100 minutes, to obtain a mixed product stream comprising hydrogen from the two reactors.

In one embodiment of the invention, the two parallel reactors may be two parallel fluid bed reactors or two fixed bed reactors.

In a further embodiment of the invention, the two parallel reactors are two parallel fixed bed reactors.

In another embodiment of the invention, the said first feed and the said second feed are switched between the said first and second reactors by a two-flow switch valve operable manually or automatically.

In another embodiment of the invention, the Group VIII metal oxides are selected from oxides of Fe, Co, Ni, Ru, Rh, Pd, Pt, Ir and Os.

In another embodiment of the invention, hydrogen is formed in both the reactors, while carbon dioxide is formed in only one reactor.

In another embodiment of the invention, the reducing agent used in step i. of the invention is selected from the group consisting of hydrogen, carbon monoxide, or a mixture thereof.

In a further embodiment of the invention, the preferred reducing agent used in step i. of the invention is hydrogen.

In another embodiment of the invention, the preferred concentration of the reducing agent in the feed gas is in the range of from 5 mole % to 50 mole %, the preferred gas hourly space velocity is in the range of from 500 $cm^3g^{-1}h^{-1}$ to 20000 $cm^3g^{-1}h^{-1}$, the preferred temperature is in the range of from 400° C. to 600° C. and the preferred reduction period is in the range of from 1 hour to 20 hours.

In another embodiment of the invention, the preferred gas hourly space velocity in step ii. of the process for the first feed is in range of 200 $cm^3g^{-1}h^{-1}$ to 20000 $cm^3g^{-1}h^{-1}$ with the preferred temperature in the first reactor in the range of from 350° C. to 600° C., the preferred gas hourly space velocity for the second feed being in the range of 200 $cm^3g^{-1}h^{-1}$ to 20000 $cm^3g^{-1}h^{-1}$ with the preferred temperature in the second reactor being in the range of from 350° C. to 600° C., the preferred interval of time for the feed switch over being in the range of from 1 minute to 30 minute, the preferred concentration of methane in the first feed being in the range of 10 mole % to 100 mole %, the preferred concentration of ethane and higher alkanes in the first feed is in the range of from 0 mole % to 5 mole %; the preferred concentration of $N_2$, He, Ar or their mixture in the first feed is in the range of from 0 mole % to 90 mole %, the preferred concentration of steam present in the second feed being in range of from 20 mole % to 100 mole %, the preferred concentration of oxygen in the second feed being in the range of 0 mole % to 5 mole %, the preferred concentration of $N_2$, He, Ar or their mixture in the second feed is in the range of from 0 mole % to 80 mole % and the preferred group VII metal oxide in the solid catalyst is nickel oxide, cobalt oxide or iron oxide or any mixture thereof.

In a further embodiment of the invention, the solid catalyst used in the process of the invention is preferably selected from NiO—$ZrO_2$, NiO—CoO—MgO, NiO—$Fe_2O_3$—$ThO_2$, NiO—$CeO_2$, NiO—$Y_2O_3$, NiO/Ce—NaY Zeolite, NiO/H-beta zeolite, NiO/H-ZSM-5 zeolite, NiO/HM zeolite and NiO/Si-MCM-41 zeolite or a mixture of two or more thereof.

DETAILED DESCRIPTION OF THE INVENTION

The two parallel reactors may be two parallel fluid bed reactors or two fixed bed reactors, preferably two parallel fixed bed reactors. The first feed and the second feed are switched between the first and second reactors by a two-flow switch valve operable manually or automatically. The Group VIII metal oxides are selected from oxides of Fe, Co, Ni, Ru, Rh, Pd, Pt, Ir and Os.

Hydrogen is formed in both the reactors, while carbon dioxide is formed in only one reactor. The reducing agent used in step i. of the invention is selected from hydrogen, carbon monoxide or a mixture thereof. The preferred reducing agent used in step i. of the invention is hydrogen.

The preferred concentration of the reducing agent in the feed gas is in the range of from 5 mole % to 50 mole %, the preferred gas hourly space velocity is in the range of from 500 $cm^3g^{-1}h^{-1}$ to 20000 $cm^3g^{-1}h^{-1}$, the preferred temperature is in the range of from 400° C. to 600° C. and the preferred reduction period is in the range of from 1 hour to 20 hours. The preferred gas hourly space velocity in step ii. of the process for the first feed is in range of 200 $cm^3g^{-1}h^{-1}$ to 20000 $cm^3g^{-1}h^{-1}$ with the preferred temperature in the first reactor in the range of from 350° C. to 600° C., the preferred gas hourly space velocity for the second feed being in the range of 200 $cm^3g^{-1}h^{-1}$ to 20000 $cm^3g^{-1}h^{-1}$ with the preferred temperature in the second reactor being in the range of from 350° C. to 600° C., the preferred interval of time for the feed switch over being in the range of from 1 minute to 30 minute, the preferred concentration of methane in the first feed being in the range of 10 mole % to 100 mole %, the preferred concentration of ethane and higher alkanes in the first feed is in the range of from 0 mole % to 5 mole %, the preferred concentration of $N_2$, He, Ar or their mixture in the first feed is in the range of from 0 mole % to 90 mole %, the preferred concentration of steam present in the second feed being in range of from 20 mole % to 100 mole %, the preferred concentration of oxygen in the second feed being in the range of 0 mole % to 5 mole %, the preferred concentration of $N_2$, He, Ar or their mixture in the second feed is in the range of from 0 mole % to 80 mole % and the preferred group VII metal oxide in the solid catalyst is nickel oxide, cobalt oxide or iron oxide or any mixture thereof.

In a feather embodiment of the invention, the solid catalyst used in the process of the invention is preferably selected from $NiO-ZrO_2$, $NiO-CoO-MgO$, $NiO-Fe_2O_3-ThO_2$, $NiO-CeO_2$, $NiO-Y_2O_3$, NiO/Ce—NaY Zeolite, NiO/H-beta zeolite, NiO/H-ZSM-5 zeolite, NiO/HM zeolite and NiO/Si-MCM-41 zeolite or a mixture of two or more thereof.

The solid catalyst comprising group VIII metal oxide(s) used in the process of this invention can be prepared by the coprecipitation or impregnation catalyst preparation techniques known in the prior art.

The role of step-i of the process of this invention is to reduce the reducible metal oxide, for example nickel oxide, cobalt oxide, iron oxide, etc., present in the catalyst. This step is critical one; the reduction of group VIII metal oxide to its metallic form at least from the surface of the catalyst is essential for the catalytic activity in the process of this invention.

In step-ii of the process of this invention, the methane or methane-rich hydrocarbons, steam and oxygen are reactants, which are converted at least partly in the process. The role of steam is to react with the carbon, which is formed in the decomposition of methane on the reduced catalyst, producing carbon dioxide and hydrogen from the catalyst from time to time and thereby removing the carbon depositedon the catalyst. The role of the oxygen is to activate the carbon which is otherwise difficult to gasify by steam alone. The oxygen is consumed at least party by its reaction with the carbon to form $CO_2$. Role of the solid catalyst is to catalyse the methane decomposition reaction and the carbon gasification by steam and oxygen.

The present invention is described with respect to the following examples illustrating the process of this invention for the production of hydrogen from methane or methane-rich hydrocarbons and steam over different sold catalysts comprising nickel at different catalytic process conditions. These examples are provided for illustrative purposes only and are not to be construed as limitations on the process of this invention.

Definition of the Terms used in the Examples

GHSV=Gas hourly space velocity, defined as the volume of a gaseous feed, measured at 0° C. and 1.0 atmospheric pressure, passed over unit mass of catalyst per unit time.

Percent methane conversion is defined as the mole % of methane present in the feed converted into products other thin methane. It is estimated as follows.

Methane conversion (%)=[(moles of methane in feed–moles of methane in products)÷(moles of methane in feed)]× 100.

Hydrogen productivity in the process is expressed as the amount of hydrogen in mmol, produced per hour per gram of the catalyst used in the process.

Carbon dioxide productivity in the process is expressed as the amount of carbon dioxide in mmol, produced per hour per gram of the catalysed used in the process.

Carbon monoxide productivity in the preocess is expressed as the amount of carbon monoxide in mmol, produced per hour per gram of the catalyst used in the process.

EXAMPLES 1–10

These example illustrate the process of this invention for the production of hydrogen from methane and steam, using $NiO-ZrO_2$ (Ni/Zr mole ratio=1.0) catalyst at different process conditions.

The $NiO-ZrO_2$ catalyst was prepared by coprecipitating mixed hydroxides of nickel and zirconium from a 650 $cm^3$ aqueous solution containing 58.78 g $Ni(NO_3)_2 6H_2O$ and 46.76 g $ZrO(NO_3)_2.H_2O$ using an aqueous solution of NaOH at a pH of 9.0 at room temperature, filtering and thoroughly washing the precipitate at 105° C. for 18 h, pressing and crushing to particles of 0.3–0.4 mm size and calcining in air at 600° C. for 2 h. The surface area of the catalyst was 63 $m^2g^{-1}$.

The process of this invention using the $NiO-ZrO_2$ catalyst was carried out in two parallel stinless steel fixed bed reactors. Each reactor was packed with 0.4 g catalyst particle and was kept in a tubular furnace. Each of the two parallel reactors had a different gaseous feed but both the reactors had a common outlet. A flow switch valve was connected to the two reactors for switching the two different feeds between the two reactors regularly at an interval of time. The reactor temperature was measured by a Chromel—Mumel thermocouple located at the centre of the catalyst bed in both the reactors. The catalyst in both the reactors was reduced by passing a $H_2-N_2$ mixture over the catalyst in both the reactors at the conditions given in Table—1. After the reduction of catalyst in both the reactors, Feed—A containing methane with or without nitrogen was passed over the reduced catalyst in Reactor—A and simultaneously Feed—B containing steam with or without nitrogen and/or oxygen was passed over the reduced catalyst in Reactor—B, while switching Feed—A and Feed—B between two reactor regularly at an interval of time, at the catalytic process conditions given in Table—1.

The gaseous products obtained from both the reactors were combined and cooled by passing them through a chilled water condenser to 2–3° C. for removing the water from them by condensation. The water-free gaseous products were collected in a gas bolder for a reaction period of six hours. The collected gaseous products were analysed by gas chromatograph using a spherocarb column and thermal conductivity detector. For the gas chromatographic analysis of hydrogen in the products, high purity nitrogen was used as a carrier gas. Whereas, for the gas chromatographic analysis of the methane, carbon dioxide and carbon monoxide present in the products, helium was used as a carrier gas. The results obtained at the different process conditions are presented in Table—1.

EXAMPLE 11–18

These examples also illustrate the process of this invention for the production of hydrogen from methane and steam, using following solid catalysts: $NiO/Si-MCM-41$, $NiO/HZSM-5$, $NiO—Fe_2O_3—ThO_2$, $NiO—CoO—MgO$, $NiO/HM$, $NiO—Y_2O_3$, $NiO—CeO_2$, $NiO/Ce—NaY$.

The $NiO/Si-MCM-41$ (12 wt % Ni) was prepared by impregnating 5.0 g particles (0.3–0.4 mm of size) of high silica MCM-41 [presented by the procedure given in the reference; Choudhary, V. R. and Sansare, S. D., Proc. Indian Acad. Sci. (Chem. Sci.), volume 109, number 4, page 229–233, August 1997] with 3.4 g $Ni(NO_3)_2. 6H_2O$ from its aqueous solution by the incipient wetness technique, followed by drying at 105° C. for 12 h and calcining at 500° C. for 2 h.

The $NiO/H-ZSM-5$ (10 wt % Ni) was prepared by impregnating 7.0 g particles (0.3–0.4 mm of size) of H-ZSM-5 with Si/Al ratio of 40 (prepared by the procedure given in the U.S. patent U.S. Pat. No. 3,702,886) with 4.0 g $Ni(NO_3)_2.6H_2O$ from its aqueous solution by the incipient wetness technique, followed by drying at 105° C. for 12 h and calcining at 500° C. for 2 h.

The $NiO—Fe_2O_3—ThO_2$ (Ni:Fe:Th mole ratio= 1.0:0.05:1.0) catalyst was prepared by coprecipitating mixed hydroxides of nickel and thorium from a 600 cm³ aqueous solution containing 34.36 g $Ni(NO_3)_2.6H_2O$, 2.3 g $Fe(NO_3)_3.9H_2O$ and 69.46 g $Th(NO_3)_4.6H_2O$ using an aqueous solution of NaOH at a pH of 9.5 at room temperature, filtering and thoroughly washing the precipitate with deionized water, drying the washed precipitate at 105° C. for 18 h, pressing and crushing to particles of 0.3–0.4 mm size and calcining in air at 600° C. for 2 h.

The $NiO—CoO—MgO$ (Ni:Co:Mg mole ratio= 1.0:0.1:1.0) catalyst was prepared by coprecipitating mixed hydroxides of nickel and zirconium from a 600 cm³ aqueous solution containing 101.83 g $Ni(NO_3)_2.6H_2O$, 10.19 g $Co(NO_3)_2.6H_2O$ and 89.46 g $Mg(NO_3)_2.6H_2O$ using an aqueous solution of $Na_2CO_3$ at a pH of 9.5 at room temperature, filtering and thoroughly washing the precipitate with the deionized water, drying the washed precipitate at 105° C. for 18 h, pressing and crushing to particles of 0.3–0.4 mm size and calcining in air at 600° C. for 2 h.

The NiO/RM (10 wt % Ni) was prepared by impregnating 6.0 g particles (0.3–0.4 mm of size) of HM zeolite (Z 900H, obtained from M/s. Norton Inc.) with 3.32 g $Ni(NO_3)_2.6H_2O$ from its aqueous solution by the incipient wetness technique, followed by drying at 105° C. for 12 h and calcining at 500° C. for 2 h.

The $NiO—Y_2O_3$ (Ni/Y mole ratio=1.0) catalyst was prepared by intimately mixing 93.21 g of $Ni(NO_3)_2.6H_2O$ and 85.35 g of $(CH_3CO_2)_3Y.xH_2O$ with a mortar and pestle using 20 ml of deionized water, decomposed at 600° C. for 2 h, pressing and crushing to particles of 0.3–0.4 mm size and calcining in air at 600° C. for 2 h.

The $NiO—CeO_2$ (Ni/Ce mole ratio=1.0) catalyst was prepared by intimately mixing 54.55 g of nickel nitrate and 102.21 g of ammonium cerium (IV) nitrate with a mortar and pestle using 20 ml of deionized water, decomposed at 600° C. for 2 h, pressing and crushing to particles of 0.3–0.4 mm size and calcining in air at 600° C. for 2 h.

The NiO/Ce—NaY (10 wt % Ni, 72% Ce-exchanged NaY) was prepared by impregnating 5.0 g particles (0.3 –0.4 mm of size) 72% Ce-exchange NaY (prepared by the procedure given in the reference: Choudhary, V. R., Srinivasan, K. R. and Akolekar, D. B., Zeolites, volume 9, page 115–119, year 1989) with 2.75 g $Ni(NO_3)_2.6H_2O$ from its aqueous solution by the incipient wetness technique, followed by drying at 105° C. for 12 h and calcining at 500° C. for 2 h.

The process of this invention over each of the above catalysts was carried out in the parallel reactors and following the procedure same as that described in the earlier examples (Examples 1–10), at the catalyst reduction conditions and catalytic process conditions given in Table—2. The results, the methane conversion and the hydrogen and carbon dioxide produced in the process of this invention over the above mentioned catalysts are included in Table 2.

TABLE 1

Hydrogen production by the process of this invention using $NiO—ZrO_2$ catalyst, at different process conditions.

| | Example No. | | | | |
|---|---|---|---|---|---|
| | Example 1 | Example 2 | Example 3 | Example 4 | Example 5 |
| Catalyst Reduction Conditions | | | | | |
| Concentration of $H_2$ in $N_2—H_2$ mixture (mol %) | 50 | 30 | 45 | 5 | 15 |
| GHSV of the $N_2—H_2$ mixture (cm³ g⁻¹ h⁻¹) | 6450 | 6250 | 4550 | 4230 | 6370 |
| Catalyst reduction temperature (° C.) | 501 | 503 | 506 | 601 | 504 |
| Reduction period (h) | 2 | 3 | 2 | 10 | 5 |
| Catalytic Process Conditions | | | | | |
| Feed-A composition | | | | | |
| $CH_4$ (mol %) | 20 | 20 | 20 | 71.4 | 100 |
| $N_2$ (mol %) | 80 | 80 | 80 | 28.6 | 0 |
| Feed A GHSV (cm³ g⁻¹ h⁻¹) | 3225 | 1290 | 6450 | 3612 | 645 |

TABLE 1-continued

Hydrogen production by the process of this invention using NiO—$ZrO_2$ catalyst, at different process conditions.

Feed-B composition

| | | | | | |
|---|---|---|---|---|---|
| $N_2$ (mol %) | 19.1 | 41.2 | 19.1 | 16.3 | 55.3 |
| Steam (mol %) | 80.9 | 58.8 | 80.9 | 83.7 | 44.7 |
| $O_2$ (mol %) | 0 | 0 | 0 | 0 | 0 |
| Feed-B GHSV ($cm^3$ $g^{-1}$ $h^{-1}$) | 6773 | 3128 | 6773 | 15803 | 5837 |
| Temperature of Reactor-A (° C.) | 494 | 503 | 502 | 613 | 451 |
| Temperature of Reactor-B (° C.) | 501 | 510 | 506 | 610 | 453 |
| Pressure in Reactor-A (atm) | 1.02 | 1.02 | 1.02 | 1.03 | 1.01 |
| Pressure in Reactor-B (atm) | 1.02 | 1.02 | 1.02 | 1.03 | 1.01 |
| Feed switch overtime (min) | 5 | 5 | 5 | 5 | 15 |
| Conversion of methane (%) | 25.0 | 27.5 | 21.3 | 39.8 | 5.4 |
| $H_2$ produced (mmol. $g^{-1}$ $h^{-1}$) | 28.0 | 12.2 | 47.8 | 179.9 | 5.9 |
| $CO_2$ produced (mmol. $G^{-1}$ $h^{-1}$) | 7.0 | 3.0 | 11.9 | 39.6 | 1.4 |
| CO produced (mmol. $g^{-1}$ $h^{-1}$) | 0.0 | 0.0 | 0.0 | 6.1 | 0.0 |

| | Example No. | | | | |
|---|---|---|---|---|---|
| | Example 6 | Example 7 | Example 8 | Example 9 | Example 10 |
| Catalyst Reduction condition | | | | | |
| Concentration of $H_2$ in $N_2$—$H_2$ mixture (mol %) | 50 | 20 | 10 | 50 | 20 |
| GHSV of the $N_2$—$H_2$ mixture ($cm^3$ $g^{-1}$ $h^{-1}$) | 6450 | 6450 | 750 | 6450 | 15050 |
| Catalyst reduction temperature (° C.) | 400 | 600 | 500 | 500 | 600 |
| Reduction period (h) | 20 | 6 | 15 | 2 | 1 |
| Catalytic Process Conditions | | | | | |
| Feed A composition | | | | | |
| $CH_4$ (mol %) | 100 | 71.4 | 20 | 20 | 50 |
| $N_2$ (mol %) | 0 | 28.6 | 80 | 80 | 50 |
| Feed A GHSV ($cm^3$ $g^{-1}$ $h^{-1}$) | 645 | 3612 | 3225 | 3225 | 10320 |
| Feed B composition | | | | | |
| $N_2$ (mol %) | 55.2 | 12.2 | 19.1 | 19.1 | 19.1 |
| Steam (mol %) | 44.8 | 83.4 | 80.9 | 80.9 | 80.9 |
| $O_2$ (mol %) | 0 | 4.4 | 0 | 0 | 0 |
| Feed B GHSV ($cm^3$ $g^{-1}$ $h^{-1}$) | 5837 | 15854 | 6773 | 6773 | 6773 |
| Temperature of Reactor-A (° C.) | 356 | 614 | 501 | 493 | 590 |
| Temperature of Reactor-B (° C.) | 351 | 616 | 504 | 497 | 587 |
| Pressure in Reactor-A (atm) | 1.02 | 1.02 | 1.02 | 1.02 | 1.03 |
| Pressure in Reactor-B (atm) | 1.02 | 1.02 | 1.02 | 1.02 | 1.03 |
| Feed switch over time (min) | 5 | 5 | 1 | 25 | 7 |
| Conversion of methane (%) | 3.3 | 40.4 | 18.0 | 11.5 | 16.3 |
| $H_2$ produced (mmol. $g^{-1}$ $h^{-1}$) | 3.75 | 184.9 | 20.2 | 12.7 | 149.1 |
| $CO_2$ produced (mmol. $g^{-1}$ $h^{-1}$) | 0.94 | 37.4 | 5.1 | 3.2 | 37.4 |
| CO produced (mmol. $g^{-1}$ $h^{-1}$) | 0.0 | 9.0 | 0.0 | 0.0 | 0.0 |

TABLE 2

Hydrogen production by the process of this invitation, using different catalysts comprising nickel.

| | Example No. | | | |
|---|---|---|---|---|
| | Example 11 | Example 12 | Example 13 | Example 14 |
| Catalysts | NiO/Si—MCM-41 | NiO/H—ZSM-5 | NiO—$Fe_2O_3$—$ThO_2$ | NiO—CoO—MgO |
| Catalyst reduction conditions | | | | |
| Concentration of $H_2$ in $N_2$—$H_2$ mixture (mol %) | 30 | 25 | 40 | 50 |
| GHSV of the $N_2$—$H_2$ mixture ($cm^3$ $g^{-1}$ $h^{-1}$) | 6040 | 3250 | 5560 | 6200 |
| Catalyst reduction temperature (° C.) | 510 | 550 | 520 | 500 |

TABLE 2-continued

Hydrogen production by the process of this invitation, using different catalysts comprising nickel.

| | | | | |
|---|---|---|---|---|
| Reduction period (h) | 5.5 | 2.5 | 2.5 | 3.0 |
| Catalytic Process Conditions | | | | |
| Feed A composition | | | | |
| $CH_4$ (mol %) | 18.2 | 18.2 | 18.2 | 18.2 |
| $N_2$ (mol %) | 81.8 | 81.8 | 81.8 | 81.8 |
| Feed A GHSV ($cm^3$ $g^{-1}$ $h^{-1}$) | 2538 | 2538 | 2538 | 2538 |
| Feed B composition | | | | |
| $N_2$ (mol %) | 60 | 0.0 | 60 | 60 |
| Steam (mol %) | 40 | 100 | 40 | 40 |
| $O_2$ (mol %) | 0.0 | 0.0 | 0.0 | 0.0 |
| Feed-B GHSV ($cm^3$ $g^{-1}$ $h^{-1}$) | 9675 | 9675 | 9675 | 9675 |
| Temperature of Reactor-A (° C.) | 502 | 504 | 499 | 503 |
| Temperature of Reactor-B (° C.) | 498 | 501 | 502 | 500 |
| Pressure in Reactor-A (atm) | 1.02 | 1.02 | 1.01 | 1.04 |
| Pressure in reactor-B (atm) | 1.02 | 1.02 | 1.01 | 1.04 |
| Feed switch over time (min) | 5 | 5 | 5 | 5 |
| Conversion of methane (%) | 15.1 | 16.6 | 16.4 | 13.7 |
| $H_2$ produced (mmol. $g^{-1}$ $h^{-1}$) | 12.3 | 13.4 | 13.1 | 11.1 |
| $CO_2$ produced (mmol. $g^{-1}$ $h^{-1}$) | 3.1 | 3.4 | 3.3 | 2.8 |
| CO produced (mmol. $g^{-1}$ $h^{-1}$) | 0.0 | 0.0 | 0.0 | 0.0 |

| | Example No. | | | |
|---|---|---|---|---|
| | Example 15 | Example 16 | Example 17 | Example 18 |
| Catalyst Reduction Condition | | | | |
| Concentration of $H_2$ in $N_2$—$H_2$ | 50 | 50 | 50 | 50 |
| GHSV of the $N_2$—$H_2$ mixture ($cm^3$ $g^{-1}$ $h^{-1}$) | 5340 | 5250 | 7520 | 8430 |
| Catalyst reduction temperature (° C.) | 550 | 550 | 550 | 550 |
| Reduction period (h) | 2 | 2 | 2 | 2 |
| Catalytic Process Condition | | | | |
| Feed A composition | | | | |
| $CH_4$ (mol %) | 18.2 | 17.6 | 18.2 | 18.2 |
| $C_2H_6$ (mol %) | 0.0 | 1.0 | 0.0 | 0.0 |
| $N_2$ (mol %) | 81.8 | 81.4 | 81.8 | 81.8 |
| Feed A GHSV ($cm^3$ $g^{-1}$ $h^{-1}$) | 2538 | 2538 | 2538 | 2538 |
| Feed B composition | | | | |
| $N_2$ (mol %) | 60 | 60 | 60 | 60 |
| Steam (mol %) | 40 | 40 | 40 | 40 |
| $O_2$ (mol %) | 0.0 | 0.0 | 0.0 | 0.0 |
| Feed-B GHSV ($cm^3$ $g^{-1}$ $h^{-1}$) | 9675 | 9675 | 9675 | 9675 |
| Temperature of Reactor-A (° C.) | 498 | 503 | 501 | 504 |
| Temperature of Reactor-B (° C.) | 502 | 501 | 504 | 499 |
| Pressure in Reactor-A (atm) | 1.02 | 1.06 | 1.02 | 1.09 |
| Pressure in Reactor-B (atm) | 1.02 | 1.06 | 1.02 | 1.09 |
| Feed switch over time (min) | 5 | 5 | 5 | 5 |
| Conversion of methane (%) | 12.0 | 15.5 | 15.7 | 18.6 |
| $H_2$ produced (mmol. $g^{-1}$ $h^{-1}$) | 9.5 | 11.9 | 12.7 | 15.1 |

TABLE 2-continued

Hydrogen production by the process of this invitation, using different catalysts comprising nickel.

| | | | | |
|---|---|---|---|---|
| $CO_2$ produced (mmol. $g^{-1}$ $h^{-1}$) | 2.4 | 3.0 | 3.2 | 3.8 |
| CO produced (mmol. $g^{-1}$ $h^{-1}$) | 0.0 | 0.0 | 0.0 | 0.0 |

Advantages of the Invention

1. Unlike the prior art steam reforming and auto thermal reforming processes, the process of this present investigation operates at low temperature, below about 650° C. Because of the low temperature operation, the process of this invention requires less energy and lower capital. Also since the water gas shift reaction $CO+H_2O=CO_2+H_2$ is thermodynamically favoured at lower temperatures, there is almost no net formation of carbon monoxide in the process of this invention, at below 600° C. there is no formation of carbon monoxide in the process of this invention.
2. Unlike the prior art steam reforming and auto thermal reforming processes, carbon monoxide-free hydrogen can be produced by the process of this invention.
3. Unlike the prior art steam reforming and auto thermal reforming processes, the conversion of methane and steam take place separately in two different reactors, two parallel reactors, each having a different feed, and the two different feeds one comprising methane and second comprising steam with or without oxygen, are switched regularly between the two reactors at an interval of time so that when methane decomposition reaction take place in one reactor producing hydrogen and carbon deposited on the catalyst, at the same time the gasification of the carbon by its reaction with steam and oxygen, producing carbon dioxide and hydrogen, takes place in the second reactor, and this two reactions in two separate reactors take place in cyclic manner, so that there is no build up of carbon on the catalyst in both the parallel reactors.
4. Unlike the prior art processes based on low temperature methane decomposition, the production of carbon monoxide free hydrogen in the process of this invention is continuous without build up of carbon on the catalyst and consequently without the build up of a large pressure drop across the catalyst bed and also without the catalyst deactivation by carbon deposition or cooking.

We claim:

1. A process for the continuous production of hydrogen from methane and/or natural gas and/or methane-rich hydrocarbons and steam at temperature at or below 650° C., using a solid catalyst comprising group VIII metal oxide(s) in two parallel reactors, which comprises:
    i) reducing the solid catalyst in both the reactors by contacting the catalyst with a gaseous feed comprising a reducing agent at a concentration in the range of from about 1 mole % to about 100 mole %, at a gas hourly space velocity in the range of from 100 $cm^3g^{-1}h^{-1}$ to 100,000 $cm^3g^{-1}h^{-1}$ at a temperature in the range of from 350° C. to 650° C. and at a pressure of at least about 1.0 atm for a time period in the range of from 0.1 h to 100 h,
    ii) contacting a first gaseous feed comprising methane and/or natural gas and/or methane rich hydrocarbons, at a gas hourly space velocity in the range from about 50 $cm^3g^{-1}h^{-1}$ to about 50,000 $cm^3g^{-1}h^{-1}$ with the solid catalyst reduced in step-i in a first parallel reactor, at a temperature in the range from 300° C. to 650° C. and at a pressure of about at least 1 atmosphere, and simultaneously contacting a second gaseous feed comprising steam, with the solid catalyst reduced in step-i in a second parallel reactor, at the same gas hourly space velocity, temperature and pressure as that employed in the first reactor, while regularly switching over the first gaseous feed and the second gaseous feed, between the two parallel reactors at an interval of time in the range from about 0.1 min to about 100 min, to obtain a mixed product stream comprising hydrogen from the two reactors.

2. A process as claimed in claim 1, wherein in step-i the reducing agent is selected from the group consisting of hydrogen, carbon monoxide, and a mixture thereof.

3. A process as claimed in claim 1, wherein in step-i the mole concentration of the reducing agent is in the range 5 mole % to 50 mole %.

4. A process as claimed in claim 1, wherein in step-i the gas hourly space velocity is in the range from 500 $cm^3g^{-1}h^{-1}$ to 20,000 $cm^3g^{-1}h^{-1}$.

5. A process as claimed in claim 1, wherein in step-i the temperature is in the range from 400° C. to 600° C.

6. A process as claimed in claim 1, wherein in step-i the reduction period is in the range from 1 h to 20 h.

7. A process as claimed in claim 1, wherein in step-ii the gas hourly space velocity of the first gaseous feed ranges from 200 $cm^3g^{-1}h^{-1}$ to 20,000 $cm^3g^{-1}h^{-1}$.

8. A process as claimed in claim 1, wherein in step-ii the temperature in the first parallel reactor ranges from 350° C. to 600° C.

9. A process as claimed in claim 1, wherein in step-ii the gas hourly space velocity of the second gaseous feed ranges from 200 $cm^3g^{-1}h^{-1}$ to 20,000 $cm^3g^{-1}h^{-1}$.

10. A process as claimed in claim 1, wherein in step-ii the temperature in the second parallel reactor ranges from 350° C. to 600° C.

11. A process as claimed in claim 1, wherein in step-ii the interval of time of the feed switch over ranges from one minute to 30 min.

12. A process as claimed in claim 1, wherein in step-ii the concentration of methane in the first gaseous feed ranges from 10 mole % to 100 mole %.

13. A process as claimed in claim 1, wherein in step-ii the concentration of alkanes other than methane in the first gaseous feed ranges from 0 mole % to 5 mole %.

14. A process as claimed in claim 1, wherein in step-ii the concentration of $N_2$He, Ar or their mixture in the first gaseous feed ranges from 0 mole % to 90 mole %.

15. A process as claimed in claim 1, wherein in step-ii the concentration of steam in the second gaseous feed ranges from 20 mole % to 100 mole %.

16. A process as claimed in claim 1, wherein in step-ii the concentration of oxygen in the second gaseous feed ranges from 0 mole % to 5 mole %.

17. A process as claimed in claim 1, wherein in step-ii the concentration of $N_2$, He, Ar or their mixture in the second gaseous feed ranges from 0 mole % to 80 mole %.

18. A process as claimed in claim 1, wherein the group VIII metal oxide(s) in the solid catalyst is selected from nickel oxide, cobalt oxide or iron oxide or a mixture thereof.

19. A process as claimed in claim 1, wherein the solid catalyst is selected from the group consisting of $NiO-ZrO_2$, $NiO-CoO-MgO$, $NiO-Fe_2O_3-ThO_2$, $NiO-CeO_2$, $NiO-Y_2O_3$, $NiO/SiO_2$, $NiO/Al_2O_3$, $NiO/SiO_2-Al_2O_3$, $NiO/UO_3$, NiO/Y-zeolite, NiO/MCM-41, NiO/Mordenite zeolite, NiO/ZSM-5 zeolite, NiO/beta zeolite and a mixture of two or more thereof.

20. A process as claimed in claim 1, wherein the two parallel reactors are packed-bed reactors.

* * * * *